Sept. 6, 1960 E. WILLE 2,951,389

CONTROL FOR MOTOR DRIVEN NUT TIGHTENER

Filed July 26, 1955 3 Sheets-Sheet 1

Inventor:
Eduard Wille
by Paul H. Smolka

Sept. 6, 1960 E. WILLE 2,951,389

CONTROL FOR MOTOR DRIVEN NUT TIGHTENER

Filed July 26, 1955 3 Sheets-Sheet 2

Jnventor:
Eduard Wille
by [signature]

CONTROL FOR MOTOR DRIVEN NUT TIGHTENER

Filed July 26, 1955 3 Sheets-Sheet 3

Inventor:
Edward Wille
by [signature]

United States Patent Office 2,951,389

Patented Sept. 6, 1960

2,951,389

CONTROL FOR MOTOR DRIVEN NUT TIGHTENER

Eduard Wille, Wuppertal-Cronenberg, Germany, assignor to Eduard Wille, Wuppertal-Cronenberg, Germany, a firm Filed July 26, 1955, Ser. No. 524,558

Claims priority, application Germany July 28, 1954

6 Claims. (Cl. 74—337)

Known torque-responsive power screw drivers which are driven by electric motors or pneumatically have a relatively high speed of rotation in order to obtain a short screwing in time. Since the maximum moment of tension for the screw to be screwed in requires a determined torque, the driving power of the screw driver must likewise be made high in accordance with the relatively high speed of rotation, although a high torque is required for only a short time during the tightening of the screw, unless some shock action is utilised for the purpose of producing this peak degree. The limitation of the degree of tightening of the screw is usually effected by means of ratchet couplings or striking mechanisms.

When screwing in expansion screws, this degree of tightening must be kept constant within very narrow limits, since these screws are stressed almost to their yield point during screwing in. Torque-responsive screwdrivers having a shock effect are useless for this purpose. In the first place, the degree of tightening achieved is greatly dependent on the number of blows applied, which however cannot be kept constant because of the rapid succession of blows, while in addition the power of the individual blow is variable within wide limits because of the indeterminable reactions of workpiece, screw and screwing tool on the striking operation. In addition, the shock effect causes rapid wear on the striking surfaces, which results in a considerable variation of the force of the blows and a relatively short life of the screwdriver.

Torque-responsive screwdrivers having striking mechanisms are impractical where accurate tensioning of a screw is necessary. It has moreover been found that, at the high speeds used, ratchet couplings also apply a powerful shock action and are therefore likewise unsuitable for tightening expansion screws.

In view of the foregoing, it has been proposed to provide torque-responsive screw drivers or the like with a two-speed drive, the higher speed drive being effective during the initial driving of the screw and the lower speed, and higher torque, drive becoming automatically effective when the screw has been run into full contact with the work. The dual speed driving is effected either by special gearing or by providing two separately powered drives, with slip clutches or the like effecting the automatic change over in response to the reaction when the screw fully contacts the work.

However, for the final torque responsive power cutoff, these prior art devices have relied on such means as friction clutches and the like, which soon become inaccurate as torque meters due to wear of frictional surfaces or the like, thus rendering it very difficult to repetitively apply the same pre-set torque on successive operations.

In accordance with the present invention, an accurate torque responsive arrangement is provided for applying the torsional moment to the screw, nut or the like, not directly through the working spindle, but indirectly by way of a control clutch and a torsion bar connected thereto, while a slip ring provided with contacts is mounted fast on the working spindle and a suitable control device releases the clutch, which is power operated in any desired manner in response to a current impulse when the adjusted torsional moment is attained.

A contact finger is preferably rotatably and securably mounted on the torsion bar, and cooperates with the contacts on the slip ring. The working spindle is advantageously made hollow and the torsion bar mounted therein to be freely rotatable.

A number of exemplified embodiments of the invention are illustrated in the accompanying drawings, in which:

Figs. 1 and 2 somewhat schematically illustrate two dual speed torque responsive screw drivers or the like to which the torque responsive means of the invention is applicable;

Figure 1:
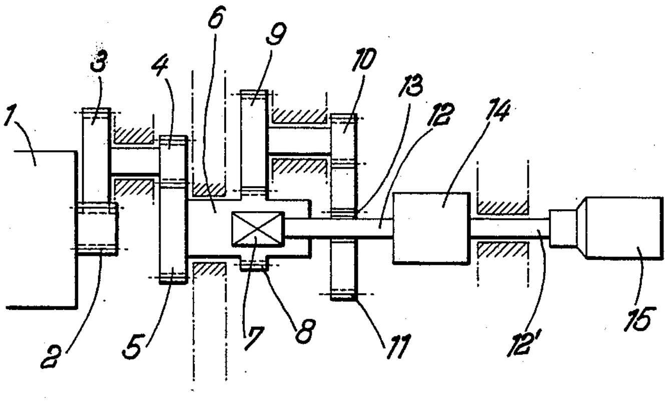

In Figure 1, 1 denotes a driving motor, which by its pinion 2 drives a double intermediate gear 3, 4. The gear 4 drives a gear 5, which is joined fast to a hollow shaft 6, with a slip clutch 7 disposed therein. The slip clutch 7 drives a shaft 12, which is mounted axially in alignment with the working spindle 12'. On the hollow shaft 6 is provided a ring gear 8, which drives the double intermediate gear wheels 9, 10. The gear 10 drives a gear 11, which is mounted on the shaft 12 with the interposition of an overrunning clutch or freewheel 13. A torque limiting clutch 14 connects the shaft 12 to the working spindle 12'. At the free end of the working spindle 12' is mounted a tool 15, for example a screwdriver or spanner.

Figure 2:
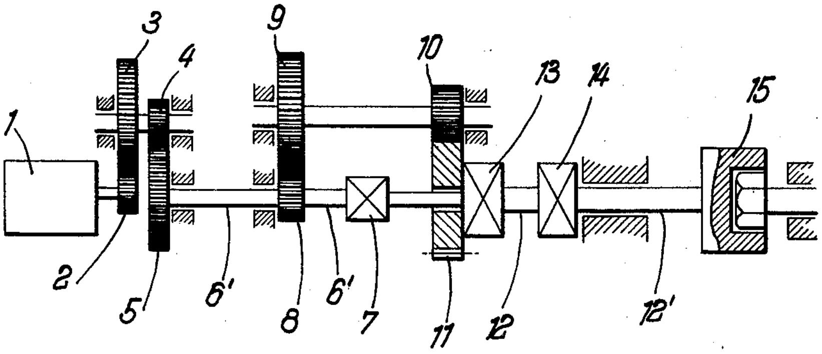

The embodiment illustrated in Figure 2 has an arrangement similar to that shown in Figure 1.

A motor 1 drives the shaft 6' through a reduction gear 2, 3, 4, 5 at the speed which is to be used for screwing-in the screws. This speed is transmitted to the shaft 12 through a slip clutch 7. In addition, the gear 11', which can be coupled to the shaft 12 through an overrunning clutch 13, is driven through the intermediate gear, 9, 10 at a substantially lower speed. In both embodiments, when screwing-in a screw, the latter is first turned in at high speed by the shaft 6' by way of the slip clutch 7, shaft 12, torque limiting clutch 14, and shaft 12'. The overrunning clutch 13 does not act at present, since the shaft 12 has a higher speed than the gear 11. When the head of the screw starts to rest on its support, the slip clutch 7 comes into action, so that the speed of the shaft 12 declines. When it falls below the speed of the gear 11, the overrunning clutch 13 engages and the drive is effected through the intermediate gear 9, 10 at a substantially lower speed and with a correspondingly greater torsional moment. When the screw has attained the required, predetermined initial tension, the torque limiting clutch 14 comes into operation and terminates the screwing-in operation.

Arrangements of these types enable screws to be screwed in rapidly, and nevertheless to be tightened with substantial accuracy. Moreover, the accuracy is also retained for a long time, since at the low speed at which the torque limiting clutch 14 comes into action there can be no appreciable wear. This also leads to a longer life of the entire apparatus. As a third advantage, the power of the motor can be greatly reduced, so that the apparatus has a lower weight.

Figure 3:
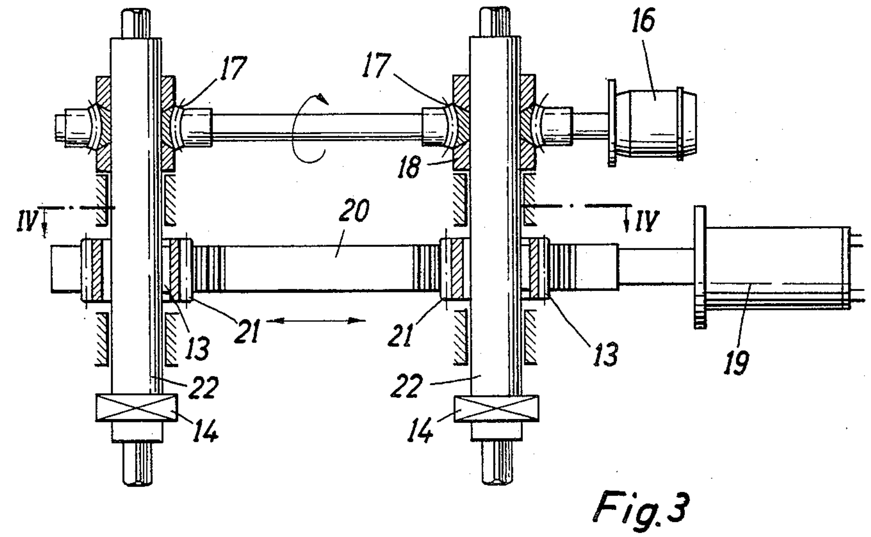
Fig. 3 is a somewhat schematic top plan view of a multiple spindle dual speed torque responsive screw driver incorporating the invention.
Figure 4:
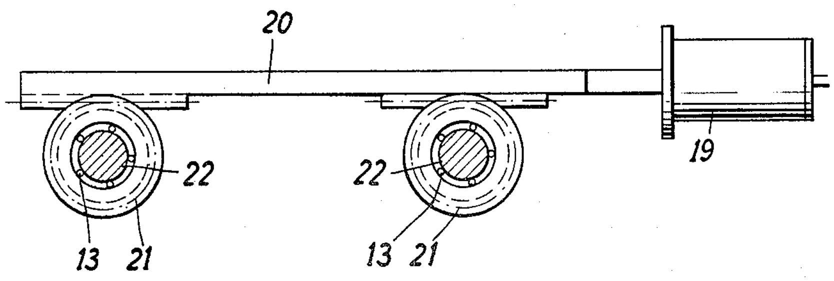
Fig. 4 is a sectional view on the line IV—IV of Fig. 3.

In Figures 3 and 4 which have to be read and understood in view of Figs. 1 and 2, 16 designates a separate high speed motor, 17 a high speed gear consisting of a worm and worm wheel, 18 automatic control devices, in this case slip clutches. These slip clutches 18 or the like are operative only at high speed and are connected with switching means actuating independent and preferably hydraulic motor means 19 driving the tool shaft 23 at low speed near the end of the screwing-in operation when said slip clutches 18 becomes at least partly inoperative. The piston rod of said motor means 19 extends into a toothed rack 20 engaging pinions 21 each of which drives over an overrunning clutch 13, a working spindle 22, a torque limiting clutch 14, and a tool shaft 23.

The mode of operation is as follows:

The screws are turned in by the working spindles 22 driven by the high speed motor 16 through the high speed gear 17 (worm and worm wheel) until the screw heads run up against their supports. During this operation the low speed drive has been ineffective by means of the overrunning clutches 13. As soon as the nuts have run up to their supports, and thus both automatic control devices or slip clutches 18 start to slip, i.e. after they close a circuit actuating the driving means 19, which may be hydraulic, pneumatic, mechanical, electric or the like, the overrunning clutches 13 come into effect. The driving means 19 is preferably connected to a toothed rack 20. It is thereby rendered possible to produce at low speed a torsional moment of the required magnitude for transmission through the torque limiting clutches 14 to the working spindle 23. This embodiment enables screws not only to be rapidly screwed in but also to be tightened with great accuracy which is maintained for a long time, since at the low speed at which the control device or slip clutch 18 comes into action no appreciable wear occurs. It is of further advantage that the power of the high speed motor may be held relatively small, since for the final tightening a completely separate drive 19 is provided. Thus the weight of the apparatus is kept very low. As an additional advantage a plurality of working spindles 22 may be arranged one behind the other, each of these spindles being driven during the high speed tightening by the high speed motor 16 and during the low speed running by independent means 19.

Figure 5:
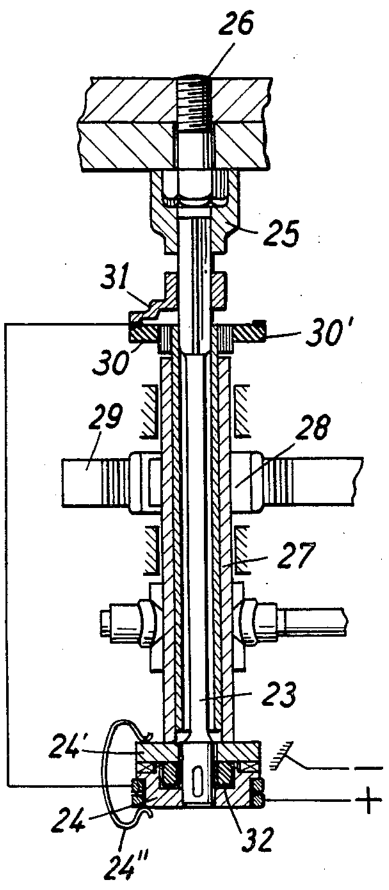
Figs. 5 and 6 is a partly schematic and partly sectional view of the torque measuring means incorporated in a power screw driver showing the same in operative and in inoperative position, respectively.
Figure 6:
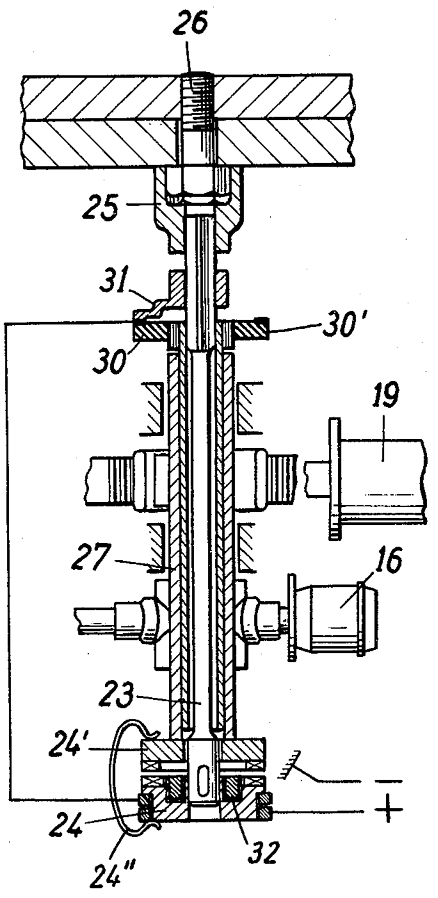

In the embodiment illustrated in Figure 5, a torsion bar 23 is slidably and unrotatably connected at one end to a component 24 of a clutch, which can be operated electromagnetically as shown, electrohydraulically, or similarly, while the other end of the bar 23 acts on a box spanner insert 25 which grips a nut or the head of a screw 26. Said clutch component 24 when electromagnetically operated is provided with an electric coil 32 which is activated by the electric current closed by the contact finger 31 and the ring contact 30' mounted on the stationary slip ring 30. The torsion bar 23 is mounted within a tubular working spindle 27 which is driven by means of a high speed gear (not shown) and a low speed gear 29, 28 (rack and pinion) in the manner already described with reference to Figures 3 and 4. The working spindle 27 is firmly connected to the permanently polarized clutch component 24' while the other clutch component 24 is slidably attached, as stated before, to the torsion bar 23. The clutch composed of said components 24, 24' is shown in Fig. 5 in engaged position in which said components are held engaged by one or more tension springs 24 and in Fig. 6 in disengaged position component 24 being repulsed from component 24' by the created magnetic force. Opposite the other end of the working spindle 27 is mounted a stationary slip ring 30 which is provided with contacts 30' and cooperates with a contact finger 31 mounted on the torsion bar 23 to rotate therewith. The box spanner insert 25 is provided at the end of the torsion bar 23.

The mode of operation is as follows: The two speed-drive of the working spindle 27 has already been described with reference to Figs. 3 and 4. When the screw head or nut runs up to its support and is being tightened by means of the low speed gear 28, 29 a torsional moment is applied through the box spanner insert 25 and causes the torsion bar 23 to twist until the contact finger 31, which initially has been set to a predetermined value of the torsional moment, reaches the contact 30' on the slip ring 30 and closes a circuit. The resulting current impulse is in any suitable and well known manner, for example magnetically or electrohydraulically, used to disengage the clutch components 24, 24', thus disconnecting the drive spindle 27 with its low speed drive 28, 29 from the torsion bar 23 and its box spanner insert 25. The same contact 30' may also deenergize the drive (not shown) of the rack 29 so that the tightening of the screw 26 to a predetermined value of a torsional moment is then completed.

While several specific embodiments of my invention have been shown and described in detail to illustrate the application of the principles of my invention, it will be understood that the same may be otherwise embodied without departing from such principles and without avoiding the scope of the appended claims.

What I claim as my invention is:

1. In a power operated, torque responsive driving tool having motor means and a work driving element, torque responsive drive means interconnecting said motor means and element and comprising a driving spindle; driving mechanism connecting the motor means to said spindle; a relatively elongated torsion bar connected at one end to said element; a disengageable clutch connecting said spindle to the other end of said torsion bar; and means operatively interconnecting said spindle, said bar and said clutch and operable, responsive to twisting of said bar relative to said spindle due to torque reaction of said element, to disengage said clutch.

2. A tool as claimed in claim 1 in which said clutch is disengageable responsive to an electric control signal; and said means includes a first contact carrying member fixed to said spindle, and a second contact member adjustably secured to said bar; said members being connected in a control circuit for said clutch and completing said circuit upon a pre-settable twisting of said bar relative to said spindle.

3. A tool as claimed in claim 1 in which said spindle is tubular and said bar is disposed through said spindle.

4. A tool as claimed in claim 1 in which said driving mechanism comprises relatively high speed gear means, driven by a motor included in said motor means, and rack and gear means driven by a second drive included in said motor means.

5. A tool as claimed in claim 4 including slip responsive means for shifting the driving mechanism from high speed to low speed operation.

6. A tool as claimed in claim 4 including plural spindles driven by said rack and gear means and each coupled to a torsion bar through a disengageable clutch.

References Cited in the file of this patent

UNITED STATES PATENTS

| | | |
|---|---|---|
| 942,913 | Keller | Dec. 14, 1909 |
| 1,904,322 | Norling | Apr. 18, 1933 |
| 2,128,715 | Reich | Aug. 30, 1938 |
| 2,139,221 | Bronander | Dec. 6, 1938 |
| 2,172,991 | Segard | Sept. 12, 1939 |
| 2,489,474 | Andren | Nov. 29, 1949 |